United States Patent [19]
Homma et al.
[11] 3,732,551
[45] May 8, 1973

[54] MAGNETIC SINGLE WALL DOMAIN MEMORY

[75] Inventors: Noriyuki Homma, Kokubunji; Yoshihiko Noro, Yokohama; Shigeru Yoshizawa, Kodaira, all of Japan

[73] Assignee: Hitachi, Ltd., Tokyo, Japan

[22] Filed: Feb. 24, 1972

[21] Appl. No.: 229,090

[30] Foreign Application Priority Data

Feb. 24, 1971 Japan ....................................46/9192

[52] U.S. Cl. ..........................340/174 TF, 340/174 SR
[51] Int. Cl...........................G11c 11/14, G11c 19/00
[58] Field of Search ...................340/174 TF, 174 SR

[56] References Cited

UNITED STATES PATENTS

| | | | |
|---|---|---|---|
| 3,577,131 | 5/1971 | Morrow | 340/174 TF |
| 3,618,054 | 11/1971 | Bonyhard et al | 340/174 TF |
| 3,638,208 | 1/1972 | Chow | 340/174 TF |
| 3,651,496 | 3/1972 | Danylchuk et al | 340/174 TF |

OTHER PUBLICATIONS

IBM Technical Disclosure Bulletin, "Read/Write Control" by Walker; Vol. 13, No. 11, 4/71 pp. 3474, 3475.

IBM Technical Disclosure Bulletin "Angelfish Logical Connectives For Bubble Domains" by Almasi et al., Vol. 13, No. 10, 3/71, pp. 2992, 2993.

IBM Technical Disclosure Bulletin "Bubble Domain Decoder With Built–In Memory" by Keefe et al., Vol. 14, No. 6, 11/71, pp. 1915, 1916.

*Primary Examiner*—Stanley M. Urynowicz, Jr.
*Attorney*—Paul M. Craig, Jr. et al.

[57] ABSTRACT

In a memory device using magnetic bubble elements, a memory bubble within a memory loop and a control bubble from a decoder are caused to repel each other, to lead the memory bubble to an erase circuit and to erase it therein, and thereafter, the repelled control bubble and an information bubble are further caused to repel each other, to feed either of the bubbles into the memory loop and to thus effect write-in of the information.

Read-out of information is carried out such that a memory bubble within a memory loop and the control bubble are caused to repel each other, to detect either of the repelled bubbles by means of a detector.

8 Claims, 12 Drawing Figures

MAGNETIC SINGLE WALL DOMAIN MEMORY

BACKGROUND OF THE INVENTION

1. Field of the Invention

The present invention relates to magnetic memory devices, and more particularly to a magnetic memory device which utilizes the characteristics of cylindrical magnetic domains called magnetic bubbles.

2. Description of the Prior Art

There has recently been suggested a large-capacity memory device of the shift register type which employs magnetic bubble element. With a memory device of this type, it is common practice to select one from among a number of memory loops, and to write information (to-be-stored) in or to read out (stored) information from the selected loop. For such a selection of the memory loop, there has been used heretofore a decoder employing semiconductor elements such as transistors and diodes. The input and output signals of the decoder are in the form of electrical signals.

For this reason, if, by way of example, the section of the memory loops is disposed on a magnetic substance substrate such as an orthoferrite single crystal substrate and the decoder is provided on an IC substrate, connecting lines between both the substrates are required at least by the number of the memory loops, and they are very massive lowering reliability, increasing the cost, etc. In order to avoid such disadvantages when the number of memory loops is reduced, the number of bits of memory information included in one loop should be made large and, hence, the speed of read-out and write-in is unpreferably lowered.

SUMMARY OF THE INVENTION

An object of the present invention is to provide a memory device with which the memory loops, the decoder, etc. may be provided on an identical magnetic substance substrate.

Another object of the present invention is to reduce the number of connecting lines for a substrate on which the memory device is provided.

Still another object of the present invention is to provide a novel memory device of the shift register type, particularly employing magnetic bubble elements.

The present invention is characterized in that, in order to accomplish the above-mentioned objects, a control bubble supplied for "write-in" to any one memory loop and a memory bubble within the loop are caused to repel each other, to conduct the memory bubble to an erase circuit and to eliminate or erase it therein, the control bubble and an information bubble generated in response to writing information are caused to repel each other, to send either bubble into the memory loop and to write it therein, and a control bubble supplied for "read-out" and the memory bubble are caused to repel each other, to conduct either bubble to a detector and to read it out therein.

DESCRIPTION OF THE PREFERRED EMBODIMENTS

In the following description, known means may be used as a transmission system for bubbles. There are well known, for example, a system using T- and I-bar type permalloy patterns and rotating fields, a system using conductor loops and driving current, and their modifications, and any of them may be adopted. Herein, the transmission system using the TI patterns and rotating field shall be employed, as will be discussed below.

Figure 1:
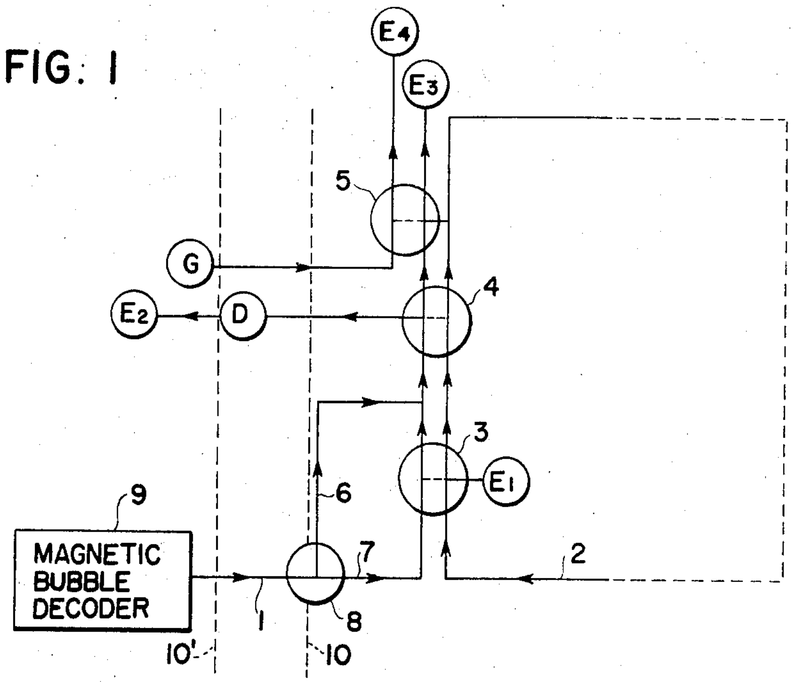
FIGS. 1 and 2 are skeleton diagrams showing an embodiment of the present invention.

Referring now to the accompanying drawings, the present invention will be further explained. FIG. 1 shows an example of an arrangement of a writing in and reading out circuit for one memory loop. In the figure, numeral 1 designates a path of a control bubble from a decoder 9 which path communicates to switching means 8. As stated below, the switching means 8 switches the supply of the control bubble to a path 6 or 7 by means of a write-in and read-out control line 10 and in response to read-out or write-in information. In case of a write-in-instruction, the control bubble is supplied to the path 7 to advance to an "H" circuit 3 hereinafter referred to. In the circuit, the control bubble and a memory bubble within the memory loop are caused to repel each other. As a result, the memory bubble is fed to an erase circuit $E_1$ to be eliminated or erased, while the control bubble advances to an "H" circuit 4. Since the memory bubble has been already erased, the control bubble passes through the "H" circuit 4, and further advances to an "H" circuit 5. In the circuit 5, it is brought into mutual repulsion with an information bubble, to be red into a memory loop 2 and to be written therein. The information bubble is generated by an information bubble source G. Further, the generation of the information bubble is controlled by the write-in information control line 10 and in response to the information to-be-stored.

In contrast, in the case of a read-out operation, the control bubble is supplied to the path 6, and advances to the "H" circuit 4. In the circuit, it is brought into mutual repulsion with the memory bubble within the memory loop 2. Then, it is conducted to a detector D, and is read out.

Figure 2:
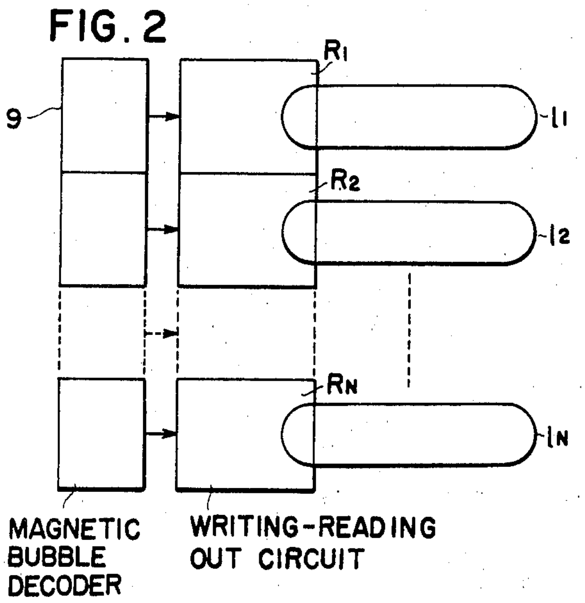

The write-in and read-out of desired information for one memory loop may be carried out in the foregoing manner, with a memory device accordingly obtained if, as shown in FIG. 2, the above-described writing in and reading out circuits $R_1$ to $R_N$ are respectively provided for $2^n$ memory loops $l_1$ to $l_N$ ($N = 2^n$). In FIG. 2, the decoder 9 delivers at its outputs, in order to select only one desired memory loop, the control bubble for only the memory loop of an address represented by the particular coded input electrical signal. The write-in information control line 10 is common to all the circuits $R_1$ to $R_N$, so that the same information bubbles are produced from all the information bubble sources belonging to the respective loops. Consequently, even if the information bubbles are fed to all the loops, they are entered into the memory loops only when they enter the "H" circuits 5 simultaneously with the control bubbles. Therefore, the information bubbles are never written in unselected loops. In addition, the control bubble is switched by the write-in and read-out control line. Therefore, the memory bubble is never erased during read-out.

The foregoing various means are formed in proximity to a magnetic substance substrate such as an orthoferrite single crystal substrate, while the substrate is subjected to a rotating field by means not shown (for example, exciting coils in the X and Y directions to which sine and cosine alternating currents are applied). The fact that a magnetic bubble is generated by application of a rotating field from a magnetic bubble source formed on a magnetic substance substrate, and the fact that the bubble is fed and returned through a path made of permalloy films of, e.g., T- and I-bar types, are already known as discussed in "Electronic Material," September issue, 1970, page 78 to page 84, "Application of Magnetic Bubble Domain," December 15, 1970, the Electrical Society and the Society of Telecommunication, and so forth. Such prior art devices, per se, are also utilized as some of the component parts of the present invention.

Figure 11A:
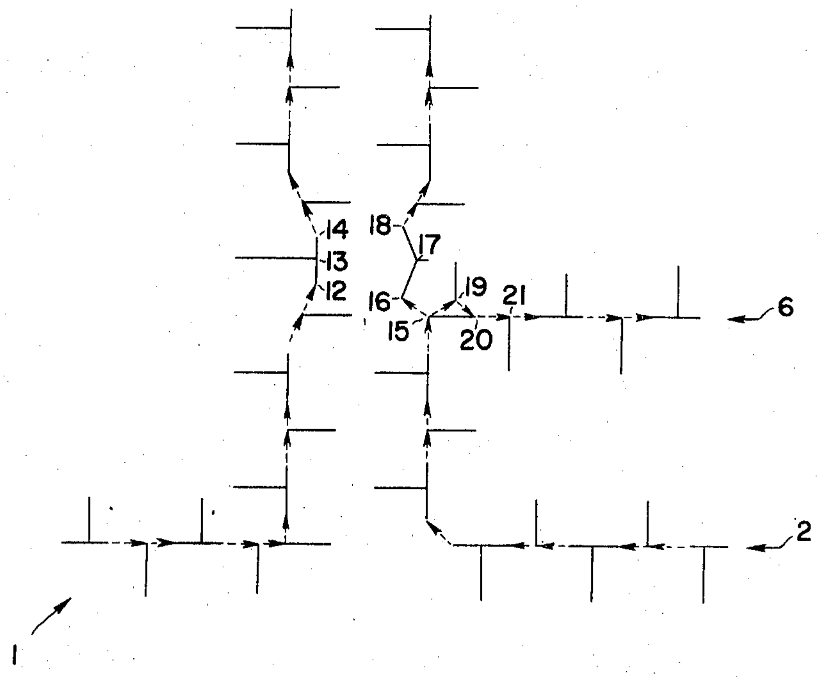
FIGS. 11(a) and 11(b) are schematic diagrams showing an example of an arrangement of an "H" circuit.

FIG. 11(a) illustrates an example of arrangement of the "H" circuit. In the figure, the paths 1 and 2 are made of the T- and I-bar type permalloy films. When bubbles are simultaneously present at opposite positions of the paths, e.g., at points 11 and 15, the bubble at the point 15 is repelled to advance in the course of 15 – 19 – 20 – 21. In contrast, when no bubble is present at the point 11, the bubble at point 15 advances in the course of 16 – 17 – 18. In either case, the bubble at the point 11 is adapted to advance in the course of 11 – 12 – 13 – 14.

Figure 11B:
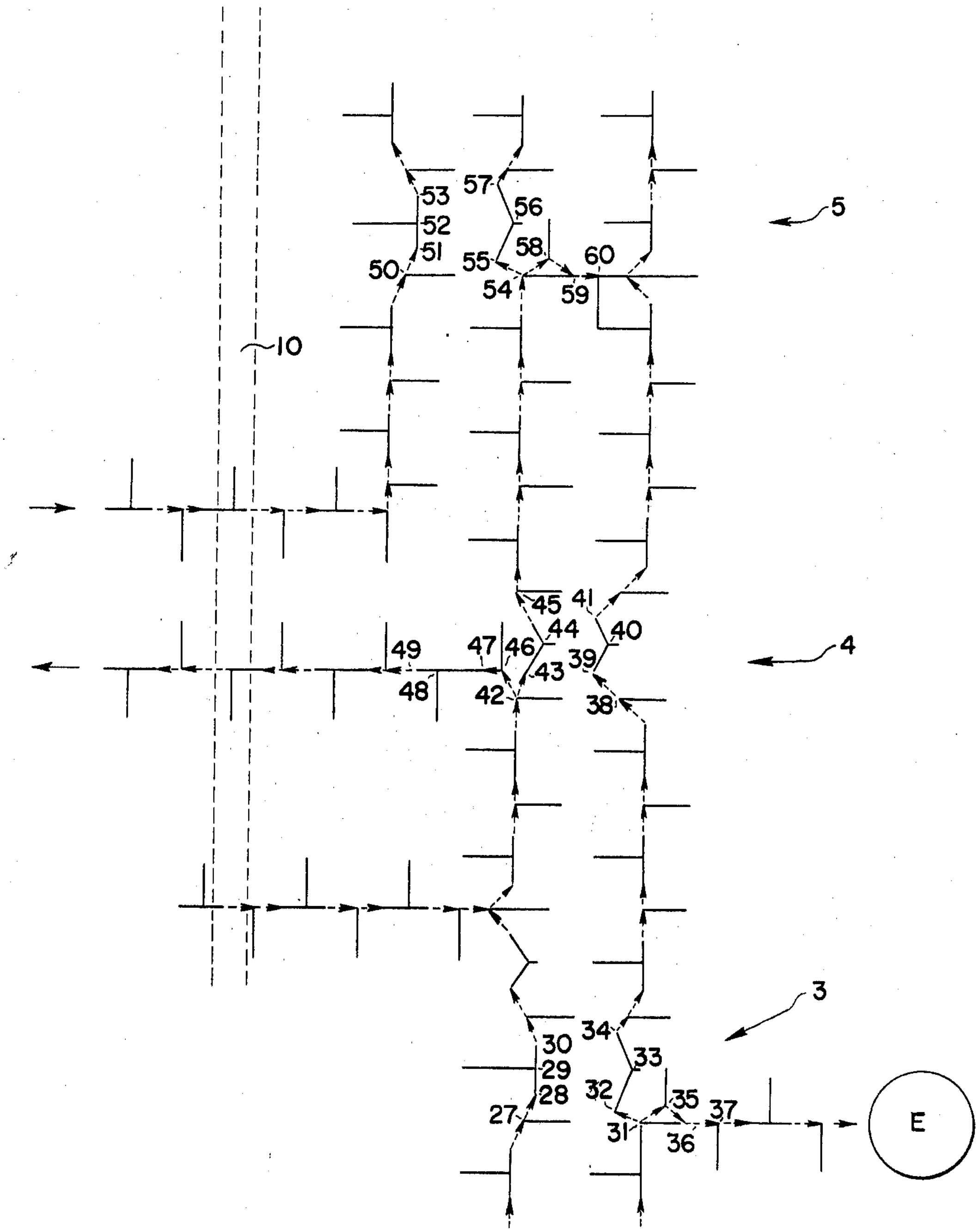

It will be understood that the write-in and read-out for only the selected loops may be accordingly carried out with such a circuit arrangement. FIG. 11(b) shows an example in which the foregoing circuit arrangement is employed as each "H" circuit in FIG. 1.

Figure 3:
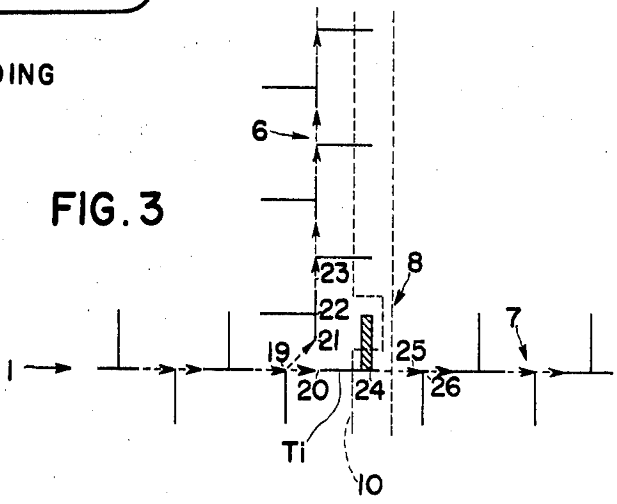
FIG. 3 is a schematic diagram showing an example of an arrangement of switching means employed in the embodiment of FIGS. 1 and 2.

FIG. 3 illustrates an example of an arrangement of the switching means which is turned on and off by the write-in and read-out control line. In the figure, a part (oblique line part) of one T-bar type permalloy film $T_i$ is formed of a hard magnetic substance having a demagnetizing force higher than the rotating field, and it is intersected by the write-in and read-out control line 10. The permalloy film $T_i$ magnetized by a current flowing through the control line 10, and the polarity of the magnetization differs depending on the direction of the current, i.e., on whether the operation is write-in or read-out. The magnetization polarity of $T_i$ is such that, in the case of a write-in signal, the control bubble at point 19 advances in the course of 20 – 24 – 25 – 26, while in the case of a read-out signal, is advances in the course of 21 – 22 – 23. Herein, once $T_i$ is magnetized, the magnetization is sustained until the write-in or read-out is completed and, hence, it is unnecessary to keep the current flowing during the operation.

Figure 4:
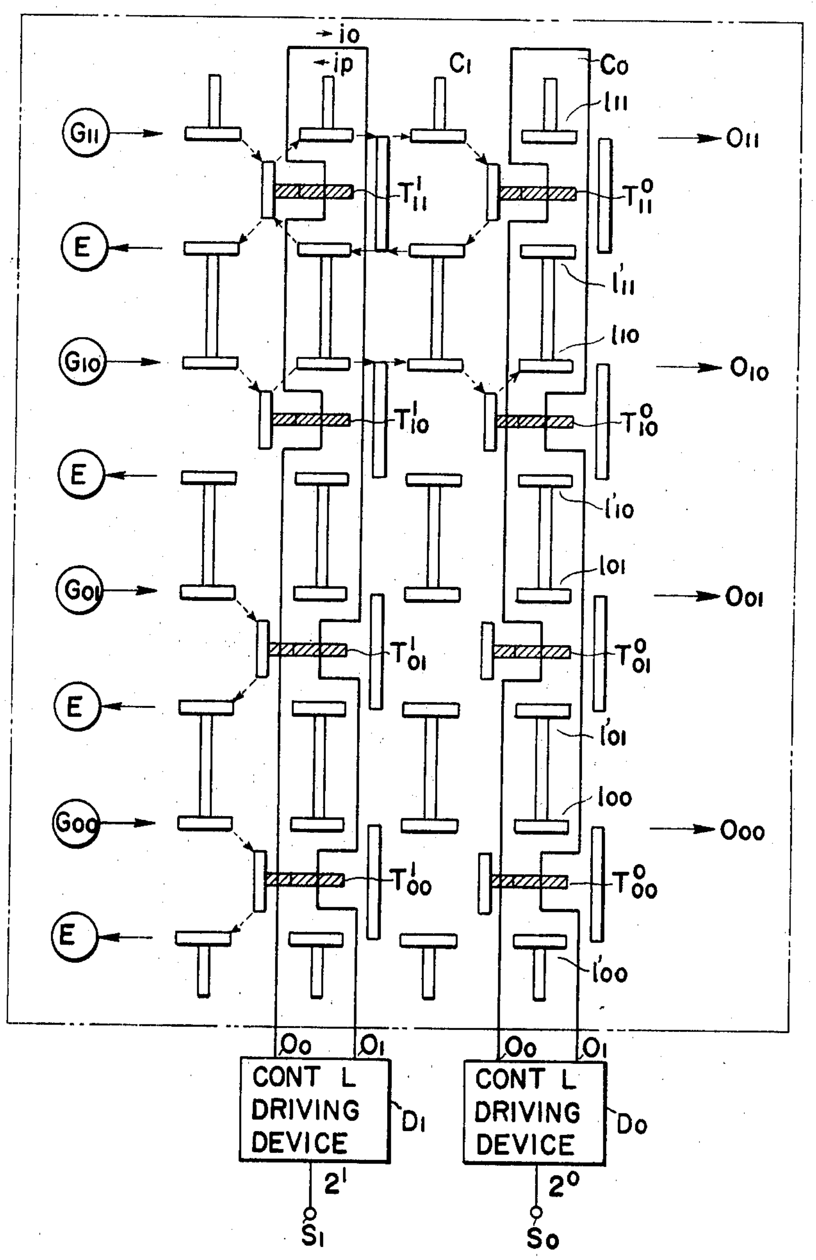
FIG. 4 is a schematic diagram showing an example of arrangement of a decoder employed in the embodiment of FIGS. 1 and 2.

FIG. 4 shows an example of an arrangement of the decoder (2 bits). Referring to the figure, control-line drivers $D_0$ and $D_1$ cause a current $i_1$, being directed from an output terminal $0_1$ to one $0_0$, to flow to address control lines $C_0$ and $C_1$, if coded input electrical signals $S_1$ and $S_0$ indicating addresses of memory loops are "1". On the other hand, they cause a current $i_0$ in the opposite direction to flow, if the signals are "0". The writing pattern of, for example, the control line $C_1$ for the T-bar type permalloy film $T'_{11}$ having the hard magnetic substance bar (oblique line part) is formed such that, when the current $i_1$ flows, the bubble from a magnetic bubble source $G_{11}$ advances straight along a going path $l_{11}$ through $T'_{11}$, while when the current $i_0$ flows, the bubble is branched to a returning path $l'_{11}$ through $T'_{11}$ to return to the erase circuit E. In the T-bar type permalloy films having hard magnetic patterns as are different in the writing pattern of the control line from $T'_{11}$, for instance, in $T'_{00}$, a switching operation reverse to the above is conducted, so that the bubble is branched to the returning path at $i_1$, while it advances straight along the going path at $i_0$.

Assuming now that the coded input electrical signals "1" and "0" be respectively applied to the drivers $D_1$ and $D_0$, the currents $i_1$ and $i_0$ flow through the control lines $C_1$ and $C_0$, respectively. Then, among the hard magnetic bars intersecting with the control line $C_1$, those $T'_{11}$ and $T'_{10}$ are magnetized so as to linearly advance the bubbles, while those $T'_{01}$ and $T'_{00}$ are magnetized so as to branch the bubbles to the returning paths. On the other hand, among the hard magnetic bars intersecting the control line $C_0$, those which are magnetized so as to linearly advance the bubbles are $T^0_{10}$ and $T^0_{00}$, while $T^0_{11}$ and $T^0_{01}$ are magnetized so as to branch them to the returning paths.

After all, among the bubbles generated from the bubble sources $G_{00}$ to $G_{11}$, the one which advances straight along the going path to appear at output ($O_{10}$) is only that produced from $G_{10}$. Similarly, when input signals "00", "01", and "11" are applied, the bubbles appear only at outputs $O_{00}$, $O_{01}$ and $0_{11}$, respectively.

With such construction, the bubble outputs (control bubbles) corresponding to the coded input electrical signals indicating the addresses may be obtained at desired memory loops.

Figure 5:
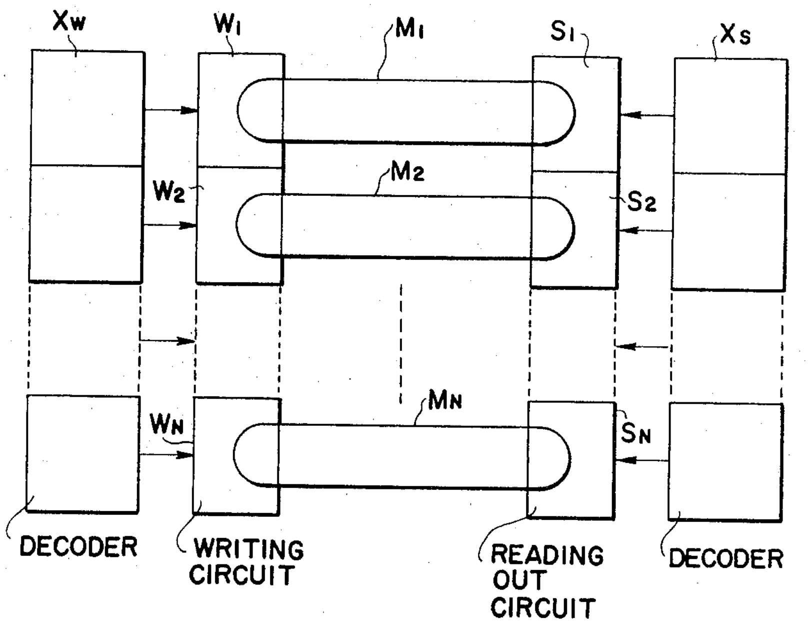
FIG. 5 is a skeleton diagram showing another embodiment of the present invention.
Figure 6:
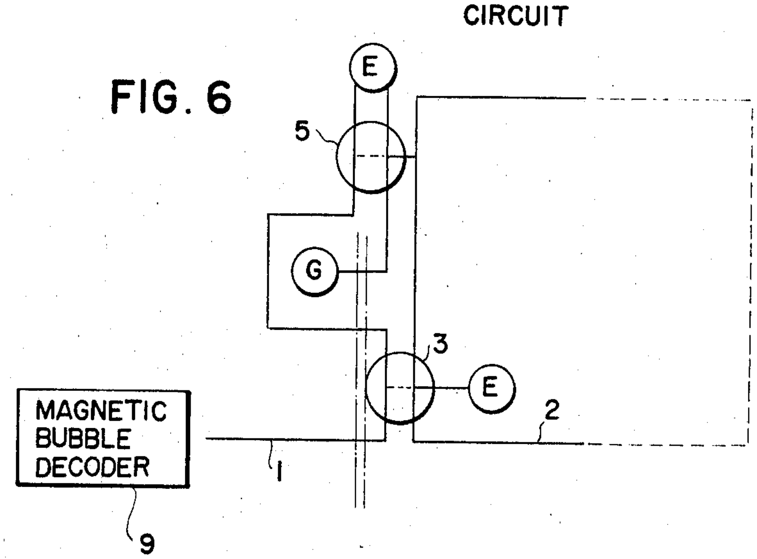
FIG. 6 is a skeleton diagram showing an example of an arrangement of a write-in circuit employed in the second-mentioned embodiment.

Since, according to the foregoing system, only one decoder is used for write-in and read-out, a switching means is required. When, however, the write-in and read-out operations are separately effected as shown in FIG. 5, a switching means is unnecessary. Referring to the figure, at both ends of memory loops $M_1$ to $M_N$, there are provided write-in circuits $W_1$ to $W_N$ and read-out circuits $S_1$ to $S_N$ for the respective loops, and decoders $X_W$ and $X_S$. While the write-in circuit may comprise the means for effecting a write-in operation in FIG. 1, i.e., the "H" circuits 3 and 5, information bubble source G, write-in information control line 10', etc., it is also possible to conduct the write-in operation by repelling the information bubble as illustrated in FIG. 6.

Figure 7:
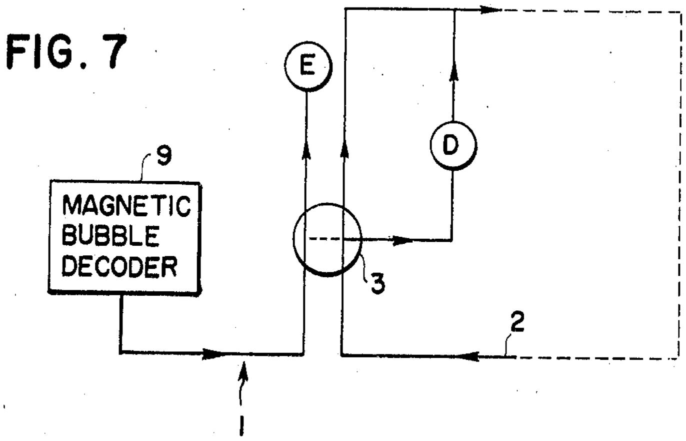
FIGS. 7 and 8 are skeleton diagrams each showing an example of an arrangement of a read-out circuit employed in the embodiment in FIG. 5.
Figure 8:
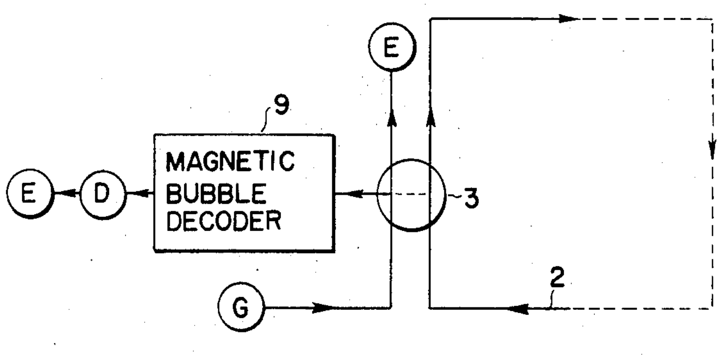
Figure 9:
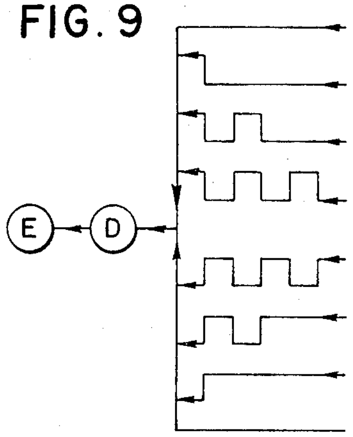
FIG. 9 is a skeleton diagram showing an example of arrangement of a read-out path.

Similarly, while the means for effecting a read-out operation in FIG. 1, i.e., the "H" circuit 4, detector D, etc. may be used as the read-out circuit, it is also possible to carry out detection by repelling the memory bubble as illustrated in FIG. 7. Alternatively, as illustrated in FIG. 8, an arrangement is also possible in which a magnetic bubble source within the decoder is taken out, to repel a bubble appearing from the source so as to detect it through the decoder 9. Furthermore, in case of read-out, it is not necessary to provide the detectors for the respective loops, but a plurality of paths of the read-out bubbles (the repelled control bubbles or information bubbles) may be put together so as to lead the bubbles to one detector. In order, however, to make those periods of time of the read-out bubbles in all the paths in which they arrive at the detector equal, the respective paths are suitably curved as shown by way of example in FIG. 9. With such construction, the respective loops and their access times may be precisely brought into correspondence. Indeed, the access times are naturally delayed in comparison with the case where one detector is arranged for each loop. In order to remove the delay, a compressor circuit may be used as the path of the read-out bubbles. The compressor circuit may be, for example, the type described in "Intermag Conference," 1 – 3, April, 1970. As soon as a read-out bubble $B_I$ is entered into the path, an output bubble $B_0$ is pushed out, and hence, there is substantially no delay. Accordingly, if the compressor circuits are employed for all the paths of the read-out bubbles, only one detector is sufficient.

Figure 10:
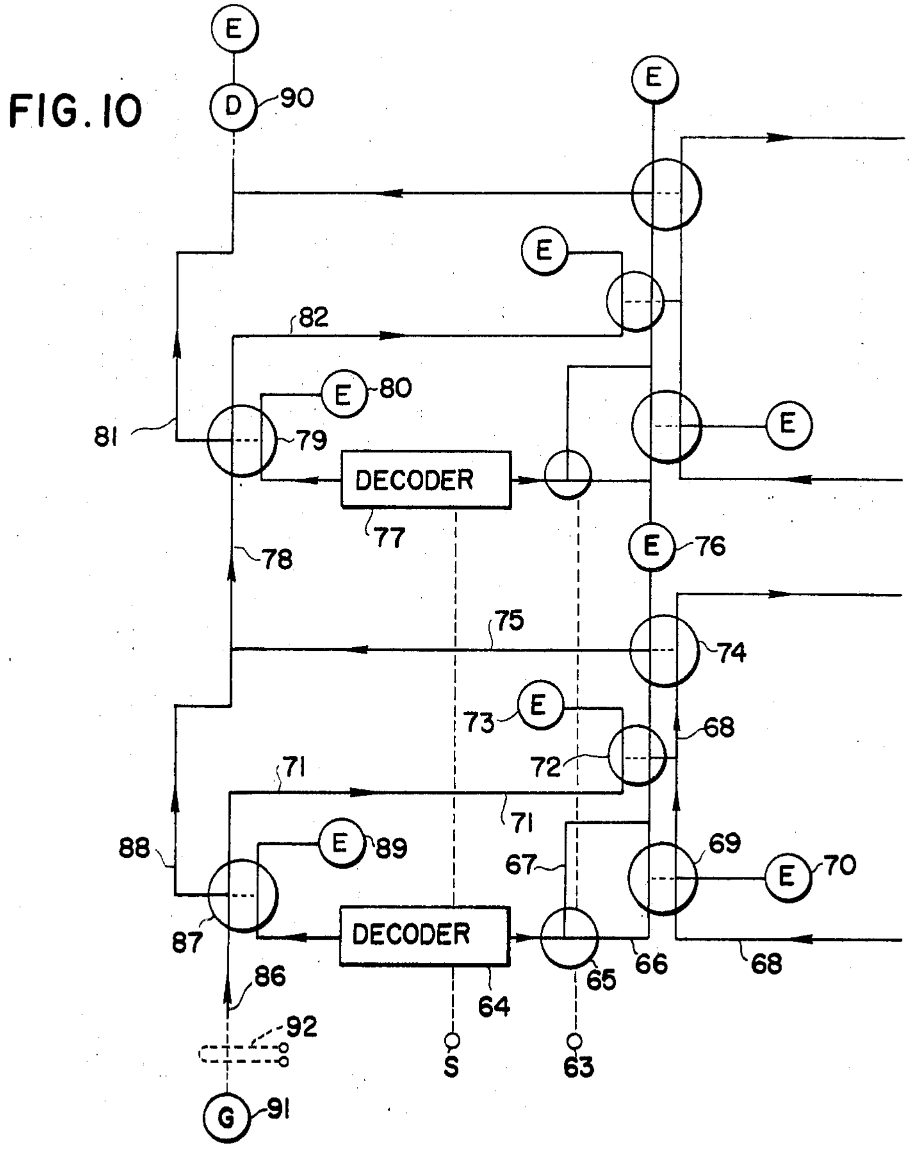
FIG. 10 is a skeleton diagram showing yet another embodiment of the present invention.

In the foregoing embodiments, the information bubble sources are provided for the respective loops, and are controlled by means of the information control lines. With a construction as shown in FIG. 10, however, only one information bubble source and one detector may be employed.

In the figure, decoder elements 64 and 77 represent those parts of the decoder of the previously discussed arrangement which correspond to the respective loops, and the right portion of them is arranged as in FIG. 1. Numeral 63 designates a write-in and read-out control line, 65 switching means adapted to be turned on and off by the control line, 66 and 67 paths from the switching means 65, 69, 72 and 74 "H" circuits of the type previously discussed, 68 a memory loop, and 73 and 76 erase circuits. Shown at 91 is an information bubble source common to the respective loops, which source is controlled by a write-in information control line 92. Output information bubbles of the bubble source 91 are supplied to any of the loops through a single bubble path for write-in and read-out which consists of 86 – 88 – 78 – 81 etc. and which is common to all the loops.

Suppose now that the memory loop 68 is to be selected by a coded input electrical signal S. Then, a control bubble is emitted from the decoder element 64 rightwards, while a bubble returns to an erase circuit 80 through an inside return path in the other decoder elements, e.g., 77. Since "H" circuits 87, 79, etc. are interposed between the common bubble path and the returning paths of the respective decoder elements, bubbles from the returning paths enter all the "H" circuits except 87. Accordingly, the bubble having advanced through the path 78, is repelled by the "H" circuit 79, to advance to the path 81 and to advance straight through the common path for write-in and read-out. In the "H" circuit 87 corresponding to the selected loop, the bubble, having advanced through the path 86, advances to a path 71 without being repelled by the "H" circuit. Then, it returns to the erase 73 via the "H" circuit 72.

During read-out, the bubble repelled by the "H" circuit 74 is read out via paths 75 – 78 – 81 by means of a detector 90.

On the other hand, during write-in, the information bubble from the information bubble source 91 advances straight through the path for write-in and read-out, since there is no selected loop until it reaches the "H" circuit 87. No bubble is emitted to the "H" circuit 87 from the returning path of the decoder element 64, so that the information bubble is entered into the path 71 to carry out the intended write-in.

As described above in detail, according to the present invention, all the constitutional means of a memory device, such as decoders, write-in and read-out circuits and memory loops, are provided on an identical magnetic substrate, whereby the number of connecting lines for the substrate may be remarkably reduced. The effect of the invention is accordingly prominent. The decoder may be of any construction insofar as it may output a control bubble to only the memory loop to-be-selected. In the case where there is only one memory loop, a mere bubble source, not the decoder, is satisfactory. In addition, an erase circuit, a returning path inside the decoder, etc. may be commonly used for a number of loops.

What we claim is:

1. A memory device comprising:

at least one memory loop for storing a plurality of memory bubbles therein;

at least one magnetic bubble detector;

at least one magnetic bubble decoder for supplying a control bubble to said memory loop in response to a coded electrical signal indicating the address of said memory loop;

at least one information bubble source;

at least one erase means;

control means for controlling the supply of the information bubble from said information bubble source to said memory loop in accordance with the information to be stored;

eliminating means for eliminating the memory bubble by causing said memory bubble within said memory loop and the control bubble to repel each other, and by sending the repelled memory bubble to said erase means;

write-in means for sending one of the control bubble and the information bubble supplied from said control means by causing said control and information bubbles to repel each other; and read-out means for sending one of the memory and control bubbles to said detector by causing both said bubbles to repel each other in accordance with the information to be read out, whereby write-in and read-out of the information with respect to a desired memory loop can be attained.

2. A memory device according to claim 1, further comprising switching means for switching the supply of the control bubble from said decoder to said eliminating means and to said read-out means between both the last mentioned means.

3. A memory device according to claim 2, wherein said at least one memory loop, detector, source, decoder and erase means comprise a plurality of memory loops, detectors, decoders, sources and erase means.

4. A memory device comprising:

at least one memory loop for storing a plurality of memory bubbles therein;

first means responsive to a coded electrical signal, representative of an address of said memory loop, coupled to said memory loop, for supplying a control bubble to said memory loop, said first means including at least one magnetic bubble decoder;

second means, coupled to said memory loop, for generating an information magnetic bubble;

third means, coupled to said memory loop, for erasing a magnetic bubble supplied thereto;

fourth means, coupled to said second means and said memory loop, for controlling the supply of an information bubble from said second means to said memory loop, in accordance with information to be stored;

fifth means, coupled to said memory loop, to said first means, and to said third means, for eliminating a memory bubble within said memory loop, by causing said memory bubble and said control bubble to repel each other, sending the repelled memory bubble to said third means to be erased thereby;

sixth means, coupled to said memory loop, said first means and said second means, for writing a control bubble into said memory loop by causing an information bubble and a control bubble supplied thereto to repel each other, sending the repelled memory bubble into said memory loop;

seventh means, coupled to said memory loop, for detecting a magnetic bubble supplied thereto; and eighth means, coupled to said memory loop and said seventh means, for reading out the contents of said memory loop, by causing a control bubble and a memory bubble to repel each other, sending the repelled control bubble to said seventh means to be detected thereby, indicating the existence of a memory bubble within said memory loop, in accordance with the information to be read out.

5. A memory device according to claim 4, further comprising ninth means, connected between said first means, said fifth means, and said eighth means, and responsive to said fourth means, for supplying the control bubbles at the output of said first means to one of said fifth and eighth means in response to the controlling-output of said fourth means.

6. A memory device according to claim 4, wherein at least one of said fifth, sixth and eighth means comprises a magnetic H-configuration switching circuit including a T-bar type permalloy film magnetic switch.

7. A memory device according to claim 4, wherein each of said fifth, sixth and eighth means comprises a magnetic H-configuration switching circuit having a T-bar type permalloy film magnetic switch.

8. A memory device according to claim 4, wherein said at least one memory loop and said at least one magnetic bubble decoder comprise a plurality of memory loops and decoders, whereby multiple information may be written-in and read-out of said memory loops.

* * * * *